US010323708B2

(12) United States Patent
Miyaji et al.

(10) Patent No.: US 10,323,708 B2
(45) Date of Patent: Jun. 18, 2019

(54) FRICTION MATERIAL COMPOSITION, FRICTION MATERIAL AND PRODUCTION METHOD THEREOF

(71) Applicant: AKEBONO BRAKE INDUSTRY CO., LTD., Tokyo (JP)

(72) Inventors: Motoyuki Miyaji, Tokyo (JP); Yuji Iwao, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/137,032

(22) Filed: Apr. 25, 2016

(65) Prior Publication Data

US 2016/0312846 A1  Oct. 27, 2016

(30) Foreign Application Priority Data

Apr. 27, 2015  (JP) .................................. 2015-090699

(51) Int. Cl.
*F16D 69/02*  (2006.01)
(52) U.S. Cl.
CPC .... *F16D 69/027* (2013.01); *F16D 2200/0026* (2013.01); *F16D 2200/0034* (2013.01); *F16D 2200/0052* (2013.01); *F16D 2200/0065* (2013.01); *F16D 2200/0069* (2013.01); *F16D 2200/0086* (2013.01); *F16D 2250/0023* (2013.01)
(58) Field of Classification Search
CPC ........ C01G 23/003; C01G 23/005; C09C 1/36
See application file for complete search history.

(56) References Cited

U.S. PATENT DOCUMENTS

| 5,891,933 A | 4/1999 | Kesavan et al. |
| 6,190,761 B1 * | 2/2001 | Sasaki ...................... C08K 7/02 |
| | | 428/295.1 |
| 6,677,041 B1 | 1/2004 | Ogawa et al. |
| 2008/0249222 A1 | 10/2008 | Itoi |
| 2010/0093908 A1 | 4/2010 | Aki et al. |
| 2010/0112350 A1 | 5/2010 | Tanimizu et al. |
| 2011/0158898 A1 | 6/2011 | Itoi |
| 2013/0221266 A1 | 8/2013 | Lu et al. |
| 2015/0369320 A1 | 12/2015 | Onda et al. |
| 2016/0221882 A1 | 8/2016 | Muroya et al. |

(Continued)

FOREIGN PATENT DOCUMENTS

| EP | 0834469 A1 | 4/1998 |
| EP | 1070751 A1 | 1/2001 |
| EP | 1329421 A1 | 7/2003 |

(Continued)

OTHER PUBLICATIONS

Extended European Search Report dated Jan. 13, 2017 in European Patent Application No. 16167246.4.

(Continued)

*Primary Examiner* — Shuangyi Abu Ali
(74) *Attorney, Agent, or Firm* — Drinker Biddle & Reath LLP

(57) ABSTRACT

A friction material composition containing an alkali metal salt as a friction adjusting material. The alkali metal salt is spherical and porous. The alkali metal salt has an average particle diameter of 20 μm to 240 μm. A friction material is produced by using the friction material composition.

12 Claims, 2 Drawing Sheets

(56) References Cited

U.S. PATENT DOCUMENTS

2016/0289442 A1 10/2016 Takada et al.
2017/0291855 A1* 10/2017 Kamada ................ C01G 23/00

FOREIGN PATENT DOCUMENTS

| | | |
|---|---|---|
| EP | 1440940 A1 | 7/2004 |
| EP | 2116514 A1 | 11/2009 |
| EP | 2937398 A1 | 10/2015 |
| EP | 3048153 A1 | 7/2016 |
| EP | 3130816 A1 | 2/2017 |
| EP | 3210941 A1 | 8/2017 |
| JP | H08-337600 A | 12/1996 |
| JP | H10-045413 A | 2/1998 |
| JP | H10-139894 A | 5/1998 |
| JP | 2000-178536 A | 6/2000 |
| JP | 2000-191800 A | 7/2000 |
| JP | 2008-094643 A | 4/2008 |
| JP | 2009-114050 A | 5/2009 |
| JP | 2010-235730 A | 10/2010 |
| JP | 2012-111650 A | 6/2012 |
| JP | 2014-122313 A | 7/2014 |
| JP | 2014-217293 A | 11/2014 |
| JP | 2015-059143 A | 3/2015 |
| WO | WO-2000-055093 A1 | 9/2000 |
| WO | WO-2008-123046 A1 | 10/2008 |
| WO | WO-2014-157616 A1 | 10/2014 |
| WO | WO-2016-063688 A1 | 4/2016 |

OTHER PUBLICATIONS

Third Party Objection dated Oct. 11, 2017 in European Patent Application No. 16167246.4.
Priority Document JP2014-217293 submitted as Exhibit 3 to the Third Party Objection dated Oct. 11, 2017 in European Patent Application No. 16167246.4, with an English translation of the claims (JP2014-217293 corresponds to previously submitted references WO-2016-063688 and EP-3210941).
Information Offer Form 2015-090699 (JP) dated Jul. 18, 2017 (25 pages) with an English translation (14 pages).
Office Action issued in European patent application No. 16167246. 4, dated Jun. 12, 2018.
Japan Patent Office, Notification of Reasons for Refusal for Japanese Patent Application No. 2015-090699, dated Dec. 10, 2018.

* cited by examiner

100μm

4μm

FRICTION MATERIAL COMPOSITION, FRICTION MATERIAL AND PRODUCTION METHOD THEREOF

CROSS-REFERENCE TO RELATED APPLICATIONS

This application claims priority from Japanese Patent Application No. 2015-090699 filed on Apr. 27, 2015, the entire subject matter of which is incorporated herein by reference.

BACKGROUND OF THE INVENTION

Technical Field

An aspect of the present invention relates to a friction material composition, a friction material using the friction material composition, and a production method thereof.

Background Art

A friction material to be used for a disc brake, a drum brake, etc. is composed of a fiber base material for imparting a reinforcing action, a friction adjusting material for imparting a friction action and adjusting its friction performance, and a binder for binding these components. These constituents are appropriately adjusted according to the intended use, the required performance, etc.

For example, JP-A-10-139894 discloses that, in a non-asbestos friction material for brakes, which uses a thermosetting resin as a binder component and contains a fiber base material, a filler and an additive, a porous spherical particle formed by binding of crystal grains of titanic acid compounds as a friction adjusting material is added. According to this technique, the fade resistance can be improved without impairing the strength or wear resistance of the friction material. In JP-A-10-139894, the titanium acid compound to be added as a friction adjusting material is produced by preparing a granulated powder through wet mixing and spray drying of raw materials and firing it.

In a friction material for brakes, the porosity of the friction material is generally adjusted to a range of approximately from 10 to 30% for enhancing the fade resistance or high speed effectiveness. Therefore, in the case of passing a puddle in rain, washing a car or parking a vehicle outdoors during the night, the friction material comes into a moisture-absorbed state. In such a moisture-absorbed state, when the vehicle speed is reduced to generally 5 km/h or less, i.e. just before stop by braking, or when a brake is completely released after loosening the brake at the time of starting an automatic car, a low-frequency abnormal noise attributable to a creep torque is generated. This low-frequency abnormal noise is also called creep noise and accompanied by discomfort and therefore, reduction thereof is demanded.

In order to solve such a problem, JP-A-2000-191800 discloses that a fluorine-based polymer having water repellency is blended with a friction material including a fiber base material, a friction adjusting material, a lubricant, and a binder. In such a friction material, the fluorine-based polymer having water repellency is scattered in a conventional matrix having hydrophilicity and therefore, even when the friction material is caused to absorb a large amount of water by car washing, etc., the creep noise can be reduced.

However, it has been reported that even by the technique described in this document, when the friction material is in a moisture-absorbed state after braking under a light load, creep noise is generated. Therefore, development of a friction material further improved in the properties preventing creep noise generation (noise characteristics) is demanded.

Patent Document 1: JP-A-10-139894
Patent Document 2: JP-A-2000-191800

SUMMARY OF THE INVENTION

Taking into account the above-described problems, an object in an aspect of the present invention is to provide a friction material composition making it possible to further improve noise characteristics in a moisture-absorbed state without impairing the properties such as fade resistance. In addition, an object in an aspect of the present invention is to provide a friction material using the friction material composition, and a production method thereof.

The friction material composition in an aspect of the present invention includes an alkali metal salt which is spherical and porous and has an average particle diameter of 20 µm to 240 µm.

In the friction material composition, the alkali metal salt preferably includes a sintered body in which a plurality of particles of 100 nm order has been fused.

In the friction material composition, the alkali metal salt is preferably potassium titanate.

In the friction material composition, the alkali metal salt is preferably contained in an amount of 5 mass % to 30 mass %.

In the friction material composition, the average particle diameter of the alkali metal salt is preferably from 90 µm to 240 µm.

It is preferred that the friction material composition does not contain a fiber base material containing a copper, a metal powder containing a copper, a fiber base material containing a copper alloy or a metal powder containing a copper alloy.

The method for producing a friction material in an aspect of the present invention includes:

pressure-forming the above-described friction material composition, thereby obtaining a preformed body, adding the preformed body to a thermoforming mold and subjecting it to heat compression forming, thereby obtaining a heat compression-formed body, and heat-treating the heat compression-formed body.

The friction material in an aspect of the present invention can be obtained by the production method described above.

In an aspect of the present invention, a friction material composition making it possible to further improve noise characteristics in a moisture-absorbed state without impairing the properties such as fade resistance can be provided. In addition, in an aspect of the present invention, a friction material using the friction material composition, and a production method thereof can be provided. Thus, an aspect of the present invention is of very great industrial significance.

DETAILED DESCRIPTION OF THE INVENTION

Figure 1:
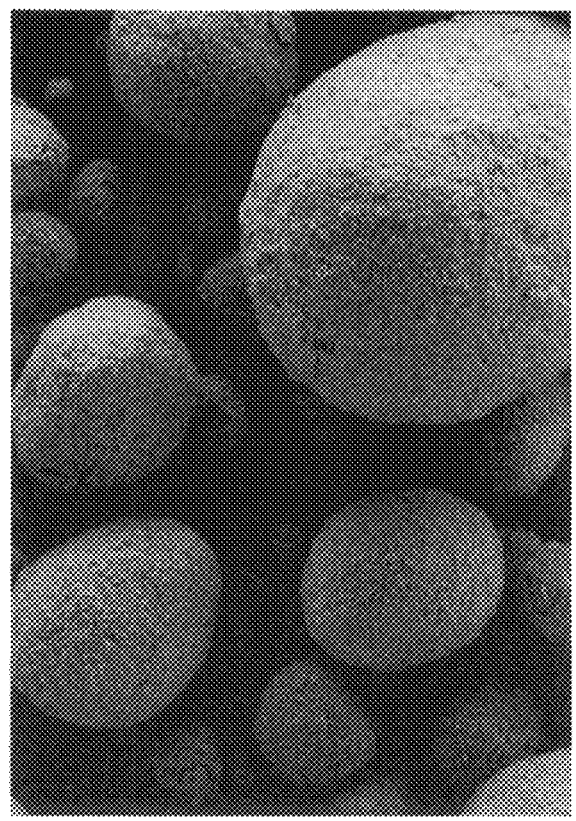
FIG. 1 is an SEM image showing an alkali metal salt (potassium titanate) constituting the friction material composition in an aspect of the present invention.

In consideration of the above-described objects, the present inventors had made many intensive studies to further improve the friction material composition and the properties, in particular, noise characteristics in a moisture-absorbed state, of a friction material using the friction material composition. An attention was focused on the property and state of wear debris attached to the surface of the friction material. Then, it had been found that in the case of a friction material producing loud creep noise, the particle diameter of the wear debris is small, the moisture absorption amount is large, and the wear debris contains a large amount of titanium (Ti) or barium (Ba), derived from the friction adjusting material.

Taking notice of this point, the present inventors have produced a friction material while changing the kind or content of the constituents of the friction material composition and repeatedly performed an experiment for evaluating the properties thereof. As a result, it has been found that when a spherical and porous alkali metal salt having an average particle diameter of 20 μm to 240 μm is added, the noise characteristics in a moisture-absorbed state can be improved without impairing the properties such as fade resistance. An aspect of the present invention has been accomplished based on this finding.

1. Friction Material Composition

The friction material composition in an aspect of the present invention includes a fiber base material, a friction adjusting material and a binder, similarly to conventional techniques. In particular, the friction material composition in an aspect of the present invention includes, as the friction adjusting material, a spherical and porous alkali metal salt having an average particle diameter of 20 μm to 240 μm.

The friction material composition in an aspect of the present invention is obtained by uniformly mixing respective components. At this time, the mixing method is not particularly limited, and a conventional technique such as Eirich mixer, Loedige mixer and pressure kneader may be utilized.

(1) Fiber Base Material

The fiber base material is not particularly limited as long as it does not contain asbestos, and a conventional fiber base material may be used. Specifically, an organic fiber, an inorganic fiber, and a non-ferrous metal fiber can be used. As the organic fiber, examples thereof include an aromatic polyamide (aramid) fiber, a flame-resistant acrylic fiber, etc. As the inorganic fiber, examples thereof include a ceramic fiber such as potassium titanate fiber and alumina fiber, a bio-soluble inorganic fiber, a glass fiber, a carbon fiber, a rock wool, etc. As the non-ferrous metal fiber, examples thereof include an aluminum fiber, a zinc fiber, etc.

Among these fiber base materials, a bio-soluble inorganic fiber may be suitably used because of its little effect on human body. Examples of such a bio-soluble inorganic fiber include a bio-soluble ceramic fiber such as $SiO_2$—CaO—MgO-based fiber, $SiO_2$—CaO—MgO—$Al_2O_3$-based fiber and $SiO_2$—MgO—SrO-based fiber, a bio-soluble rock wool, etc. The above-described fiber base materials may also be used in combination of two or more thereof.

The content of the fiber base material is preferably from 5 mass % to 40 mass %, more preferably from 5 mass % to 25 mass %.

(2) Friction Adjusting Material

As the friction adjusting material, an inorganic filler such as alkali metal salt, vermiculite and mica, an organic filler, an abrasive, a lubricant, etc. may be used.

a) Organic Filler

As the organic filler, various rubber powders (e.g., rubber dust, tire powder), cashew dust, melamine dust, etc. may be used individually or in combination of two or more thereof.

The content of the organic filler is preferably from 1 mass % to 15 mass %, more preferably from 4 mass % to 15 mass %.

b) Inorganic Filler b-1) Alkali Metal Salt

The friction material composition in an aspect of the present invention includes, as the friction adjusting material, a spherical and porous alkali metal salt having an average particle diameter of 20 μm to 240 μm. Thanks to this configuration, the noise characteristics can be improved without impairing the fade resistance.

[Formulation]

As the alkali metal salt, examples thereof include a titanic acid alkali metal salt such as potassium titanate, sodium titanate and potassium lithium titanate. Among these, potassium titanate is preferably used because of its small elution amount as an alkali metal ion, and a potassium titanate represented by formula: $K_2Ti_nO_{2n+1}$ (wherein n is an integer of 2 to 8) is more preferably used.

[Shape and Structure]

Figure 2:
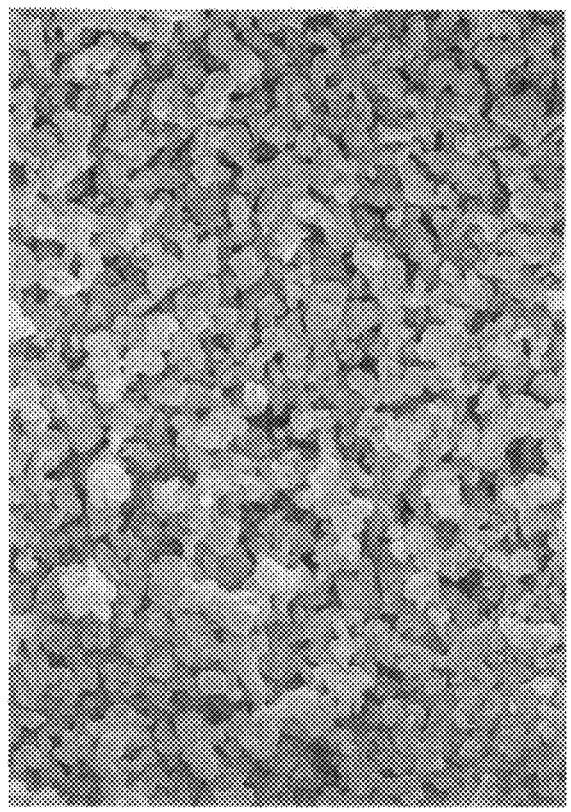
FIG. 2 is an enlarged SEM image showing the surface state of the alkali metal salt of FIG. 1.

In the friction material composition in an aspect of the present invention, an alkali metal salt being spherical and porous as shown in SEM images of FIGS. 1 and 2 must be used. The "spherical" as used in the present invention encompasses not only a so-called true spherical shape but also an elliptic spherical shape. In addition, the "porous" means that pluralities of pores are present in the sintered body surface, and these pores may be in a continuous structure or an independent structure. In the SEM image of FIG. 2, the dark gray or black portion corresponds to a pore part of the porous body. Such a shape or structure of the alkali metal salt can be confirmed by the observation using a scanning electron microscope (SEM).

In the technique described in JP-A-10-139894, as with an aspect of the present invention, a spherical and porous alkali metal salt (potassium hexatitanate) is used as the friction adjusting material. However, the alkali metal salt in this document is produced by firing a granulated powder and is composed of a secondary particle resulting from aggregation of fibrous primary particles each having a length of the μm order in the long axis direction. Therefore, the strength of the alkali metal salt itself is low and since the particle wears while loosening the aggregation of primary particles during braking, the wear debris is considered to become very fine.

On the other hand, in an aspect of the present invention, an alkali metal salt produced, for example, by firing a milled mixture obtained by mechanochemical milling of a titanium source and an alkali metal source to prepare a titanate, and subjecting this titanate to acid treatment and firing, may be used. Such an alkali metal salt includes a sintered body in which a plurality of particles each having a dimension of the 100 nm order, preferably from 100 nm to 500 nm, in both the long axis direction and the short axis direction has been fused. Therefore, the strength is high compared with the alkali metal salt as described in JP-A-10-139894, and the wear debris can have a large particle diameter. In other words, the alkali metal salt in an aspect of the present invention greatly differs in this point from the alkali metal salt as described in JP-A-10-139894.

[Average Particle Diameter]

As described above, in order to improve the noise characteristics in a moisture-absorbed state, use of an alkali metal salt having an average particle diameter of 20 μm to 240 μm is effective. However, in the case of using an alkali metal salt having an average particle diameter of 20 μm or more, the fade resistance may be deteriorated due to reduction in the porosity of the friction material and, in particular, this tendency is conspicuous in a copper-free friction material containing no copper which has an excellent thermal conductivity.

The present inventors have made many intensive studies on this point and found that when a spherical and porous alkali metal salt is used, even if the average particle diameter thereof is 20 μm or more, the porosity of the friction material can be ensured and reduction in the fade resistance can be suppressed.

Specifically, in the friction material in an aspect of the present invention, an alkali metal salt having an average particle diameter of 20 μm to 240 μm, preferably from 90 μm to 240 μm, must be used. If the average particle diameter of the alkali metal salt is less than 20 μm, the wear debris becomes too fine, and the noise characteristics in a moisture-absorbed state cannot be improved. On the other hand, according to the studies by the present inventors, it is confirmed that when the average particle diameter of the alkali metal salt is about 240 μm, the porosity of the friction material is not greatly reduced and the fade resistance can be sufficiently ensured.

The average particle diameter as used in an aspect of the present invention means the median diameter (D50), and the average particle diameter can be measured, for example, by a laser diffraction particle size distribution analyzer.

[Content]

The content of the alkali metal salt is, in total, preferably from 5 mass % to 30 mass %, more preferably from 10 mass % to 28 mass %, still more preferably from 15 mass % to 28 mass %. If the content of the alkali metal salt is less than 5 mass %, the above-described effects may not be obtained. On the other hand, if the content of the alkali metal salt exceeds 30 mass %, the content of other constituents decreases, and the properties such as strength and durability may be significantly reduced.

b-2) Other Inorganic Fillers

As the inorganic filler (other inorganic fillers) other than the alkali metal salt, a mineral powder such as vermiculite and mica, or a metal powder such as aluminum, tin and zinc, may be used. A powder including an alkali metal salt or alkaline earth metal salt having an average particle diameter of less than 20 μm may also be used. Furthermore, two or more thereof may be used in combination.

The content of the other inorganic filler is preferably from 1 mass % to 60 mass %, more preferably from 1 mass % to 50 mass %.

c) Abrasive

As the abrasive, alumina, silica, magnesia, zirconia, zirconium silicate, chromium oxide, triiron tetraoxide ($Fe_3O_4$), etc. may be used individually or in combination of two or more thereof.

The content of the abrasive is preferably from 5 mass % to 20 mass %, more preferably from 10 mass % to 20 mass %.

d) Lubricant

As the lubricant, graphite, molybdenum disulfide, tin sulfide, polytetrafluoroethylene (PTFE), etc. may be used individually or in combination of two or more thereof.

The content of the lubricant is, in total, preferably from 1 mass % to 20 mass %, more preferably from 3 mass % to 15 mass %.

(3) Binder

As the binder, various binders which are usually employed can be used. Specific examples thereof include a thermosetting resin, e.g., a straight phenol resin, various phenol resins modified with elastomer or the like, a melamine resin, an epoxy resin and a polyimide resin.

Among these, an elastomer-modified phenol resin is preferably used from the standpoint of imparting flexibility to the friction material, reducing counterpart material attack, and improving noise characteristics. Examples of the elastomer-modified phenol resin include an acrylic rubber-modified phenol resin, a silicone rubber-modified phenol resin, an NBR rubber-modified phenol resin, etc., and an acrylic rubber-modified phenol resin and a silicone rubber-modified phenol resin are preferably used. These binders may be used individually or in combination of two or more thereof.

The content of the binder is preferably from 5 mass % to 20 mass %, more preferably from 5 mass % to 15 mass %.

(4) Copper

The friction material composition in an aspect of the present invention includes the above-described components but is preferably free of a fiber base material or metal powder, which contains copper or a copper alloy. More specifically, the copper content in the friction material composition is preferably 0.5 mass % or less. The friction material formed of such a copper-free friction material composition can reduce the load on the environment or human body, because the amount of copper contained in the wear debris produced during braking is also very small.

2. Friction Material (1) Production Method of Friction Material

As for the production method of the friction material in an aspect of the present invention, the friction material can be obtained in the same manner as in conventional techniques except for using the above-described friction material composition. Specifically, the production method of a friction material in an aspect of the present invention includes:

a) a preforming step of pressure-forming the above-described friction material composition, thereby obtaining a preformed body, b) a heat compression forming step of adding the preformed body to a thermoforming mold and performing heat compression forming, thereby obtaining a heat compression-formed body, and c) a heat treatment step of heat-treating the heat compression-formed body. The conditions, etc. in each step are the same as in conventional techniques, and therefore, description thereof is omitted here.

(2) Friction Material

The friction material in an aspect of the present invention is obtained by the production method above and can be suitably used as a disc brake pad or a drum brake lining.

The friction material in an aspect of the present invention contains, as described above, an alkali metal salt having an average particle diameter of 20 μm to 240 μm, but since this alkali metal salt is spherical and porous, the porosity of the friction material can be sufficiently ensured. Specifically, the porosity of the friction material can be controlled to a range of preferably from 10% to 25%, more preferably from 15 to 25%, so that the friction material in an aspect of the present invention can be assured of fade resistance comparable to that of conventional friction materials. The porosity of the friction material can be measured by a mercury porosimeter.

EXAMPLES

An aspect of the present invention is described in greater detail below by referring to Examples and Comparative Examples.

Examples 1 to 6 and Comparative Examples 1 to 5 a) Production of Friction Material

The raw material powders shown in Table 1 were prepared, and these raw material powders were uniformly mixed in the ratio shown in Table 2 to obtain a friction material composition. This friction material composition was added to a forming mold, followed by subjecting it to pressure-forming at room temperature and 15 MPa for 1 second, thereby obtaining a preformed body. This preformed body was set in a thermoforming mold and after overlaying thereon a metal plate (pressure plate) previously coated with an adhesive, heat compression forming was performed at 150° C. and 40 MPa for 5 minutes, thereby obtaining a heat compression-formed body. This heat compression-formed body was heat-treated at 250° C. for 3 hours, then cooled to room temperature, grinded into predetermined shape and thickness, and painted, whereby a friction material (friction pad) was produced. Out of inorganic fillers a to f, inorganic fillers a to c used in Examples 1 to 6 falls within the scope of the alkali metal salt in an aspect of the present invention.

TABLE 1

| | | Sign | Name [Property and State] |
|---|---|---|---|
| Fiber base material | Organic fiber | a | aramid fiber |
| | Inorganic fiber | a | bio-soluble fiber |
| | Metal fiber | a | copper fiber |
| Friction adjusting material | Organic filler | a | cashew dust |
| | Inorganic filler | a | potassium titanate [spherical/porous, average particle diameter: 90 μm] (produced by Otsuka Chemical Co., Ltd., sample name: TERRACESS DPA) |
| | | b | potassium titanate [spherical/porous, average particle diameter: 20 μm] (produced by Otsuka Chemical Co., Ltd., sample name: TERRACESS DPA) |
| | | c | potassium titanate [spherical/porous, average particle diameter: 240 μm] (produced by Otsuka Chemical Co., Ltd., sample name: TERRACESS DPA) |
| | | d | lithium potassium titanate [scale-like, average particle diameter: 2.5 μm] |
| | | e | potassium titanate [amorphous, average particle diameter: 9.5 μm] |
| | | f | potassium titanate [plate-like, average particle diameter: 7 μm] |
| | Other inorganic filler | a | barium sulfate |
| | | b | mica |
| | | c | calcium hydroxide |
| | | d | zinc |
| | Abrasive | a | zircon-based abrasive |
| | | b | iron oxide |
| | Lubricant | a | graphite/metal sulfide |
| | | b | polytetrafluoroethylene |
| | Binder | a | phenol resin |

TABLE 2

| | Fiber Base Material | | | Friction Adjusting Material | | | | | | | | | | | | | | | |
|---|---|---|---|---|---|---|---|---|---|---|---|---|---|---|---|---|---|---|---|
| | Organic Fiber | Inorganic Fiber | Metal Fiber | Organic Filler | Inorganic Filler (alkali metal salt) | | | | | | Other Inorganic Filler | | | | Abrasive | | Lubricant | | Binder |
| | a | a | a | a | a | b | c | d | e | f | a | b | c | d | a | b | a | b | a |
| Example 1 | 4 | 3 | 0 | 4 | 25 | 0 | 0 | 0 | 0 | 0 | 18 | 1 | 3 | 1 | 13 | 7 | 12 | 1 | 8 |
| Example 2 | 4 | 3 | 0 | 4 | 0 | 25 | 0 | 0 | 0 | 0 | 18 | 1 | 3 | 1 | 13 | 7 | 12 | 1 | 8 |
| Example 3 | 4 | 3 | 0 | 4 | 0 | 0 | 25 | 0 | 0 | 0 | 18 | 1 | 3 | 1 | 13 | 7 | 12 | 1 | 8 |
| Example 4 | 4 | 3 | 0 | 4 | 13 | 0 | 0 | 0 | 0 | 0 | 30 | 1 | 3 | 1 | 13 | 7 | 12 | 1 | 8 |
| Example 5 | 4 | 3 | 0 | 4 | 6 | 0 | 0 | 0 | 0 | 0 | 37 | 1 | 3 | 1 | 13 | 7 | 12 | 1 | 8 |
| Example 6 | 4 | 3 | 0 | 4 | 13 | 0 | 0 | 13 | 0 | 0 | 17 | 1 | 3 | 1 | 13 | 7 | 12 | 1 | 8 |
| Comparative Example 1 | 4 | 3 | 5 | 4 | 0 | 0 | 0 | 0 | 0 | 25 | 13 | 1 | 3 | 1 | 13 | 7 | 12 | 1 | 8 |
| Comparative Example 2 | 4 | 3 | 0 | 4 | 0 | 0 | 0 | 17 | 8 | 0 | 18 | 1 | 3 | 1 | 13 | 7 | 12 | 1 | 8 |
| Comparative Example 3 | 4 | 3 | 0 | 4 | 0 | 0 | 0 | 25 | 0 | 0 | 18 | 1 | 3 | 1 | 13 | 7 | 12 | 1 | 8 |
| Comparative Example 4 | 4 | 3 | 0 | 4 | 0 | 0 | 0 | 0 | 25 | 0 | 18 | 1 | 3 | 1 | 13 | 7 | 12 | 1 | 8 |
| Comparative Example 5 | 4 | 3 | 0 | 4 | 0 | 0 | 0 | 0 | 0 | 25 | 18 | 1 | 3 | 1 | 13 | 7 | 12 | 1 | 8 | b) Evaluation of Friction Material (Friction Pad)

[Static/Dynamic µ Reduction Test]

The friction pad was subjected to frictional contact by using a full-size dynamometer in an environment having a temperature of 30° C. and a humidity of 80% under the conditions of a braking initial speed of 40 km/h, a braking deceleration rate of 1.96 m/s$^2$, an initial brake temperature of friction material of 70° C. or less, and a number of braking of 5,200 times, and then left standing in an environment having a temperature of 25° C. and a humidity of 100% for 15 hours. Subsequently, a static/dynamic µ reduction test was performed under the conditions of a liquid pressure of 2 MPa, a pressure reduction rate of 0.5 MPa/s, a creep torque of 200 Nm, and a number of braking of 5 times, and the static/dynamic µ reduction was evaluated by the torque drop amount.

[Noise Characteristics]

The friction pad after the static/dynamic µ reduction test was mounted on a vehicle having an FC150-made disc brake rotor, followed by subjecting to burnishing frictional contact under the conditions of a braking initial speed of 40 km/h, a braking deceleration rate of 1.96 m/s$^2$, an initial brake temperature of friction material of 70° C. or less, and a number of braking of 130 times, and then, it was left standing in an environment having a temperature of 20° C. and a humidity of 95% for 15 hours. Subsequently, a sensory evaluation was performed by the loudness of creep noise at the time of releasing the brake under a liquid pressure of 2 MPa. Specifically, a 5-grade evaluation was performed, where "1" was assigned when creep noise was not heard at all and "5" was assigned when clearly heard.

[Wear Amount and Surface Roughness of Friction Material]

The wear amount was measured at 4 portions in each of the outer circumference and inner circumference of the friction pad after the evaluation of noise characteristics, by using a digital micrometer (1/1000 Digital Micrometer, manufactured by Mitutoyo Corporation), and the average value thereof was calculated, whereby the wear amount was evaluated. In addition, the arithmetic average roughness Ra was measured at 6 portions on the friction pad surface by using a non-contact three-dimensional roughness meter (Profile Scanner PS200, manufactured by Tokyo Seimitsu Co., Ltd.), and the average value thereof was calculated, whereby the surface roughness was evaluated.

[Average Particle Diameter of Wear Debris]

After the evaluation of noise characteristics, the wear debris accumulated on the friction pad surface was collected, and the average particle diameter (D50) thereof was measured by using a particle diameter distribution measuring apparatus (SALD-7100, manufactured by Shimadzu Corporation).

[Moisture Absorption Amount of Wear Debris]

First, 100 mg of the wear debris after the evaluation of noise characteristics was dried at 105° C. for 2 hours and then, the mass $w_0$ was measured. Next, the wear debris was left standing still in a vessel filled with water and allowed to stand in an environment having a temperature of 25° C. and a humidity of 100% for 15 hours and then, the mass $w_1$ was measured. From the thus-obtained masses $w_0$ and $w_1$, the moisture absorption amount $\Delta w$ (=$w_1-w_0$) of the wear debris was calculated.

[Porosity]

The porosity of the friction pad before carrying out each evaluation test was measured by means of a mercury porosimeter (Autopore D19500 Series, manufactured by Shimadzu Corporation).

[Effectiveness and Fade Resistance]

A friction test (in conformity with JASO C 406:2000) was performed by using a full-size dynamometer testing device to evaluate the effectiveness and fade resistance (the average friction coefficient $\mu_{avg}$ in the second effectiveness test at a braking initial speed of 100 km/h and the minimum friction coefficient $\mu_{min}$ in the first fade test) of each friction material.

TABLE 3

| | Torque Drop Amount (Nm) | Noise Characteristics | Wear Amount (mm) | Surface Roughness Ra of Friction Pad (µm) | Wear Debris Average Particle Diameter (µm) | Moisture Absorption Amount Δw (mg/100 mg) | Porosity (%) | Effectiveness $\mu_{avg}$ | Fade Resistance $\mu_{min}$ |
|---|---|---|---|---|---|---|---|---|---|
| Example 1 | 24 | 2 | 0.14 | 1.29 | 5.1 | 7.7 | 20.0 | 0.46 | 0.26 |
| Example 2 | 27 | 3 | 0.10 | 1.10 | 4.5 | 8.6 | 18.0 | 0.46 | 0.24 |
| Example 3 | 24 | 2 | 0.16 | 1.43 | 5.9 | 7.0 | 21.0 | 0.46 | 0.26 |
| Example 4 | 27 | 3 | 0.10 | 1.07 | 4.3 | 8.9 | 16.5 | 0.45 | 0.23 |
| Example 5 | 30 | 3 | 0.09 | 0.90 | 3.2 | 9.5 | 14.2 | 0.44 | 0.21 |
| Example 6 | 30 | 3 | 0.09 | 0.91 | 2.9 | 9.2 | 17.0 | 0.45 | 0.23 |
| Comparative Example 1 | 36 | 5 | 0.08 | 0.85 | 1.4 | 11.4 | 15.0 | 0.44 | 0.21 |
| Comparative Example 2 | 40 | 5 | 0.07 | 0.85 | 1.5 | 11.8 | 18.0 | 0.46 | 0.24 |
| Comparative Example 3 | 35 | 4 | 0.05 | 0.82 | 1.1 | 12.1 | 20.0 | 0.45 | 0.25 |
| Comparative Example 4 | 32 | 4 | 0.07 | 0.88 | 1.6 | 10.8 | 14.0 | 0.45 | 0.20 |
| Comparative Example 5 | 40 | 5 | 0.06 | 0.79 | 1.3 | 11.7 | 15.3 | 0.44 | 0.21 | c) Comprehensive Evaluation

From Tables 1 to 3, it is confirmed that in the case of the frictions materials of Examples 1 to 6, the noise characteristics are good and the torque drop amount is small. In addition, it is confirmed from these Examples that as the average particle diameter of the alkali metal salt in an aspect of the present invention is larger, the wear debris tends to have a larger average particle diameter and a smaller moisture absorption amount. Furthermore, the comparison with the friction materials of Comparative Examples 1 to 5 using an alkali metal salt having an average particle diameter of less than 20 µm reveals that the friction materials of Examples 1 to 6 have an equivalent fade resistance. It is understood from these results that according to an aspect of the present invention, the noise characteristics in a moisture-absorbed state can be improved without impairing the fade resistance.

While the invention has been described in detail and with reference to specific embodiments thereof, it will be apparent to one skilled in the art that various changes and modifications can be made therein without departing from the spirit and scope of the invention.

What is claimed is:

1. A friction material composition comprising:
    a binder in an amount of 5 mass % to 20 mass %;
    a fiber base material in an amount of 5 mass % to 40 mass %;
    an organic filler in an amount of 1 mass % to 15 mass %;
    an alkali metal salt in an amount 5 mass % to 30 mass %;
    an inorganic filler other than the alkali metal salt in an amount of 1 mass % to 60 mass %;
    an abrasive in an amount of 5 mass % to 20 mass %; and
    a lubricant in an amount of 1 mass % to 20 mass %,
    wherein the alkali metal salt is spherical and porous and has an average particle diameter of 20 µm to 240 µm,
    wherein each particle of the alkali metal salt comprises a sintered body in which a plurality of particles in a range of 100 nm or more to 500 nm or less in both a long axis direction and a short axis direction are fused.

2. The friction material composition according to claim 1, wherein the alkali metal salt is potassium titanate.

3. The friction material composition according to claim 1, wherein the average particle diameter of the alkali metal salt is from 90 µm to 240 µm.

4. The friction material composition according to claim 1, which does not contain a fiber base material containing a copper, a metal powder containing a copper, a fiber base material containing a copper alloy or a metal powder containing a copper alloy.

5. A method for producing a friction material, comprising:
    pressure-forming the friction material composition as described in claim 1, thereby obtaining a preformed body,
    adding the preformed body to a thermoforming mold and subjecting it to heat compression forming, thereby obtaining a heat compression-formed body, and
    heat-treating the heat compression-formed body.

6. A friction material obtained by the method as described in claim 5.

7. The friction material composition according to claim 2, wherein the average particle diameter of the alkali metal salt is from 90 µm to 240 µm.

8. The friction material composition according to claim 2, which does not contain a fiber base material containing a copper, a metal powder containing a copper, a fiber base material containing a copper alloy or a metal powder containing a copper alloy.

9. The friction material composition according to claim 1, wherein the content of an inorganic filler other than the alkali metal salt is 1 mass % to 35 mass %.

10. The friction material composition according to claim 1, wherein the content of an inorganic filler other than the alkali metal salt is 1 mass % to 23 mass %.

11. The friction material composition according to claim 1, wherein the content of an inorganic filler other than the alkali metal salt is 1 mass % to 22 mass %.

12. The friction material composition according to claim 1, wherein the content of the lubricant is 13 mass % to 20 mass %.

* * * * *